(12) United States Patent
Campbell

(10) Patent No.: US 9,228,326 B1
(45) Date of Patent: Jan. 5, 2016

(54) PORTABLE DRINKER SYSTEM

(71) Applicant: Michael L Campbell, Flagstaff, AZ (US)

(72) Inventor: Michael L Campbell, Flagstaff, AZ (US)

(73) Assignee: Slick Hunting Products, Inc., Flagstaff, AZ (US)

( * ) Notice: Subject to any disclaimer, the term of this patent is extended or adjusted under 35 U.S.C. 154(b) by 144 days.

(21) Appl. No.: 14/065,421

(22) Filed: Oct. 29, 2013

(51) Int. Cl.
*E03B 3/02* (2006.01)
*E03B 3/00* (2006.01)
*E03B 3/03* (2006.01)

(52) U.S. Cl.
CPC ... *E03B 3/02* (2013.01); *E03B 3/00* (2013.01); *E03B 3/03* (2013.01)

(58) Field of Classification Search
CPC ............... E03B 3/00; E03B 3/02; E03B 3/03
See application file for complete search history.

(56) References Cited

U.S. PATENT DOCUMENTS

| | | | | |
|---|---|---|---|---|
| 2,860,349 | A * | 11/1958 | Blomqvist | 4/540 |
| 3,610,206 | A * | 10/1971 | Davis | 119/78 |
| 3,755,830 | A * | 9/1973 | Johns | 4/585 |
| 3,972,419 | A * | 8/1976 | Short | 211/78 |
| 4,577,354 | A * | 3/1986 | Stratton | 4/585 |
| 4,713,850 | A * | 12/1987 | Flaherty et al. | 4/585 |
| 4,889,078 | A * | 12/1989 | Smiley | 119/53.5 |
| 4,960,136 | A * | 10/1990 | Linnemann et al. | 5/604 |
| 4,962,730 | A * | 10/1990 | Schafer | 119/78 |
| 5,000,211 | A * | 3/1991 | Speare et al. | 135/97 |
| 5,033,411 | A * | 7/1991 | Brucker | 119/52.2 |
| 5,057,346 | A * | 10/1991 | Logan | 428/36.5 |
| 5,105,771 | A * | 4/1992 | Schafer | 119/73 |
| 5,490,532 | A * | 2/1996 | Mallookis et al. | 135/117 |
| 5,666,677 | A * | 9/1997 | Crawford et al. | 4/540 |
| 5,711,248 | A | 1/1998 | Boyd | |
| 5,809,934 | A | 9/1998 | Gavet | |
| 5,853,016 | A * | 12/1998 | Cowan | 135/90 |
| 6,390,022 | B1 | 5/2002 | Eichler et al. | |
| 6,421,853 | B1 * | 7/2002 | Pecorelli et al. | 5/606 |
| 6,766,623 | B1 * | 7/2004 | Kalnay | 52/641 |
| 6,802,088 | B1 * | 10/2004 | Gruner | 4/555 |
| 6,966,900 | B1 * | 11/2005 | Chyba et al. | 604/290 |
| 7,007,634 | B1 | 3/2006 | Pederson | |
| 7,040,249 | B1 * | 5/2006 | Mushen | 119/51.5 |
| 7,156,987 | B1 * | 1/2007 | Sanguinetti | 210/164 |
| 8,132,531 | B1 * | 3/2012 | Martin | 119/74 |
| 8,161,907 | B2 | 4/2012 | Craig | |
| 2002/0038529 | A1 * | 4/2002 | Nelson | 52/2.22 |
| 2005/0092667 | A1 * | 5/2005 | Wade | 210/163 |
| 2005/0133090 | A1 * | 6/2005 | Couturier | 137/236.1 |
| 2005/0252093 | A1 * | 11/2005 | Degarie | 52/3 |
| 2009/0212051 | A1 * | 8/2009 | Liu | 220/23.83 |
| 2010/0235979 | A1 * | 9/2010 | Pesta | 4/499 |
| 2012/0017996 | A1 * | 1/2012 | Wenger et al. | 137/1 |

* cited by examiner

*Primary Examiner* — Brian D Nash

(74) *Attorney, Agent, or Firm* — Invention to Patent Services; Alex Hobston

(57) ABSTRACT

A portable drinker system is configured with a convertible frame that enable a water collector to be assembled in a desired location. The portable drinker system may be configured to be carried by a single person and have suitable packed dimensions and weight for this purpose. The water collector has a canopy that is supported by the convertible frame and a drain opening to collect water. The water collector is configured to direct water collected therein to a drinker. A conduit may be coupled to a water collector and extend to drinker. A drinker comprises a water retainer that is configured for animals to drink therefrom. A convertible frame may have articulating scissor portions or integrally segmented poles or some combination thereof. The canopy may have sleeves for the insertion of poles that can be bowed to form a structure.

17 Claims, 15 Drawing Sheets

PORTABLE DRINKER SYSTEM

BACKGROUND OF THE INVENTION

1. Field of the Invention

The present invention relates to a portable drinker comprising a convertible water collector.

2. Background

Hunters know that game frequent watering holes and in some cases hunters will go to great lengths to find and claim a particular watering hole. Some hunters try to create watering holes by carrying out bathtubs, tarps and the like to create an artificial watering hole.

Ranchers also have to take measures to provide water for their herd and will often dig and line trenches for the collection of precipitation. This is an expensive endeavor and uncovered water holes quickly evaporate.

There exists a need for a portable water collection system that can collect and store precipitation so that it does not quickly evaporate.

SUMMARY OF THE INVENTION

The invention is directed to a portable drinker system comprising a water collector having a convertible frame and a canopy configured to extend over at least a portion of the frame. In an exemplary embodiment, the portable drinker system, as described herein, is configured to be carried by a single person and may comprise one or more straps for carrying the drinker system. The water collector may be configured to direct water to a drinker and may comprise a conduit that extends from the water collector to the drinker. In an exemplary embodiment, a drinker comprises a drink portion, or a water retainer that is configured for animals to drink therefrom. A drinker may comprise a drinker reservoir that feeds water to a drink portion. In an exemplary embodiment, an opening between the drinker reservoir and the drink portion automatically provides water when the drink portion water level drops below a certain level, such as the top of the opening in the drinker reservoir. A drinker may be configured to be collapsible and may comprise one or more conduit couplings. Furthermore, a portion of the drinker may be configured to be removed to allow the other components of the portable drinker system to be stored within the drinker reservoir. This packing configuration greatly reduces a packed drinker system volume and facilitates the portability of the system. A drinker may comprise one or more straps, such as backpack straps.

A portable drinker may comprise a collection reservoir for retaining water collected by a water collector. A collection reservoir may be configured between the water collector and a drinker. A collection reservoir may comprise a flexible or collapsible reservoir, such as a bag that can be expanded when water fills the bag. In an exemplary embodiment, a collection reservoir is configured to be located under the water collector canopy and may be coupled with a drain opening in the canopy. In still another embodiment, a collection reservoir is an integral reservoir and comprises one or more pockets that are coupled directly with the canopy. A collection reservoir may be configured to attach to a portion of the convertible frame and provide ballast or weight to prevent the water collector from being upset or turned over by the wind. In an exemplary embodiment, a collection reservoir is configured under the canopy and within the perimeter of the convertible frame support and may be attached to the support structure.

A water collector comprises a convertible frame that can be expanded from a packable volume to form a support structure for the canopy. In an exemplary embodiment, a convertible frame comprises an articulating scissor portion and when put in tension elongates to provide a support. A plurality of articulating scissor portions may be configured to form a supporting perimeter and each portion may be attached to another articulating to create a support perimeter. An articulating scissor frame may be a one-piece unit that is simply pulled to form a support for the canopy. For example, an articulating scissor support may comprise four coupled articulating scissor portions that form a square when expanded. A canopy may be draped over the articulating scissor support(s) whereby precipitation falling on the canopy is directed down to a drain opening. The outer edges of the canopy are configured to be supported at a height that is greater that the vertical position of a drain opening, thereby ensuring that precipitation is directed down and into the drain opening. The height of the articulating scissor support may be kept relatively low to provide more stability and to prevent wind from getting under the canopy and disrupting the system. In addition, keeping the height of the convertible frame and) canopy relatively low would make the water collector less conspicuous to game animals and other hunters. The maximum height of an articulating scissor support may be no more than about 42 inches, no more than about 36 inches, no more than about 30 inches, no more than about 24 inches, no more than about 18 inches, no more than about 12 inches and any range between and including the length values provided.

A convertible frame may comprise integrally segmented poles that act as a support structure. Integrally segmented poles may comprise two or more pole segments and a coupling cord that extends within a conduit within the pole segments to keep a specific number of pole segments attached. In this embodiment, the pole segments are configured to push together at their ends and the coupling cord keeps the pole segments coupled together, even when the pole segments are detached. In another embodiment, pole segments are separate and attached to form a support structure. Some of the integrally segmented poles may be configured as canopy poles that are configured to extend across the canopy to support the canopy and/or retain the canopy in a particular shape. A canopy may comprise a pole retainer, such as a pouch or pocket for receiving a first end of an extended pole on one side of the canopy and another pole retainer on an opposing side of the canopy for receiving the second end of the extended pole. The extended pole, comprising two or more attached pole segments, may be longer than the distance across the canopy from the first pouch to the second pouch. The extended pole will therefore have to curve or form an arc in order for the two ends to be retained in the pole retainers. This arc shape may provide support for the canopy and may create a concave shape suitable for precipitation collection. A drain conduit may be configured at substantially the lowest point of the concave shape formed by the one or more retained extended poles.

In addition, extended poles may be configured as support poles, wherein at least one end, or a portion of the pole, is configured to be supported by the ground. An extended pole having an end within a pole retainer that is configured to rest on the ground would be considered a support pole, for example. In an exemplary embodiment, two or more extended poles are configured to be retained in pole retainers and may be configured to slide through a canopy sleeve to secure the canopy into a particular shape.

An integrally segmented pole may comprise any suitable material including metal, aluminum, fiberglass, plastic and the like. An integrally segmented pole may have pole segments of any particular length and the pole segment lengths within a particular integrally segmented pole may be different. The length of the pole segments may preferably be kept to some length limit to provide a convertible frame that is portable and easy to carry. For example, the maximum length of any pole segment of a portable drinker system may be no more than about 42 inches, no more than about 36 inches, no more than about 30 inches, no more than about 24 inches, no more than about 18 inches, no more than about 12 inches and any range between and including the length values provided.

The water collector comprises a canopy that is configured to be supported by the convertible frame. The canopy may be made out of any suitable material that is substantially waterproof and does not allow water to flow through the canopy material. In an exemplary embodiment, the canopy material is waterproof, wherein no liquid water passes through the canopy material. Suitable canopy material include, but are not limited to, vinyl, urethane coated fabrics, plastics sheet material, and the like.

A canopy captures and guides water on one side of the canopy to one or more drain openings. A drain opening in a canopy is configured to drain precipitation collected in the canopy directly or indirectly to a drinker. In one embodiment, a drain opening comprises a conduit coupling configured to detachably attach to a conduit. In another embodiment, one or more drain openings lead directly into an integral collection reservoir that is configured under the canopy. A drain opening may comprise a one-way valve or cover that prevents debris from passing through the drain opening, or into a conduit attached thereto. A drain opening cover may be a domes screen, for example.

The portable drink system, as described herein, may be configured with a canopy that when extended over the convertible frame, has an collection area of about 10 ft$^2$ or more, of about 40 ft$^2$ or more, of about 60 ft$^2$ or more, of about 100 ft$^2$ or more, no more than 100 ft$^2$, and any range between and including the areas provided. A portable drinker system may comprise one or more water collectors and a plurality of water collectors may provide water to one or more collection reservoirs.

A canopy may be configured with an overflow drain to provide a run-off for water when the rain is excessively heavy and fills the canopy to the) overflow drain. In some cases, debris may clog the main drain opening and an overflow drain may be coupled with a collection reservoir or conduit that leads to a drinker, thereby ensuring the system continues to operate.

A conduit may be configured to extend from a drain opening to a collection reservoir and a separate conduit may extend from the collection reservoir to a drinker. A portable drinker system, as described herein, may comprise one or more collection reservoirs, and the system may be configured to attach additional reservoirs as needed for the conditions and intended purpose. For example, in arid areas such as the southwest where it rains heavily for a short amount of time, a user may attach two or more collection reservoirs to the water collector to increase the storage capacity of the system. The collected rain may then be slowly fed to the drinker and may last until the next rain event. A conduit may be any suitable length including, but not limited to, about 5 ft or more, about 10 ft or more, about 20 ft or more, about 40 ft or more, about 80 ft or more, about 100 ft or more and any range between and including the length values provided.

A portable drink system, as described herein, may be configured to fit within the drinker reservoir. Put another way, the canopy, convertible frame, collection reservoirs, and conduits may be configured to fit within the drinker reservoir. In an exemplary embodiment, the portable drink system, as described herein, is configured to be carried by a single person and can be packed into a volume that can be carried on a person's back, such as a back pack, and may have no dimension when packed greater than about 48 inches, greater than about 36 inches, greater than about 30 inches, greater than about 24 inches and the like. Likewise, the entire portable drinker system, as described herein, may be configured to have a weight of no more than about 60 lbs, no more than about 50 lbs, no more than about 40 lbs, no more than about 30 lbs and any range between and including the values provided.

A method of installing a portable drinker system of the present invention includes the steps of: providing a portable drinker system as described in herein, including combinations of features and components as required; erecting the convertible frame; attaching the canopy to the convertible frame; and extending a conduit to an animal drinker. The portable drinker system, as described in this method may, in an exemplary embodiment, have no packed dimension more than 36 inches, and may be configured to support the canopy in a concave orientation, whereby precipitation falling thereon will be directed by the canopy to the drain opening.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
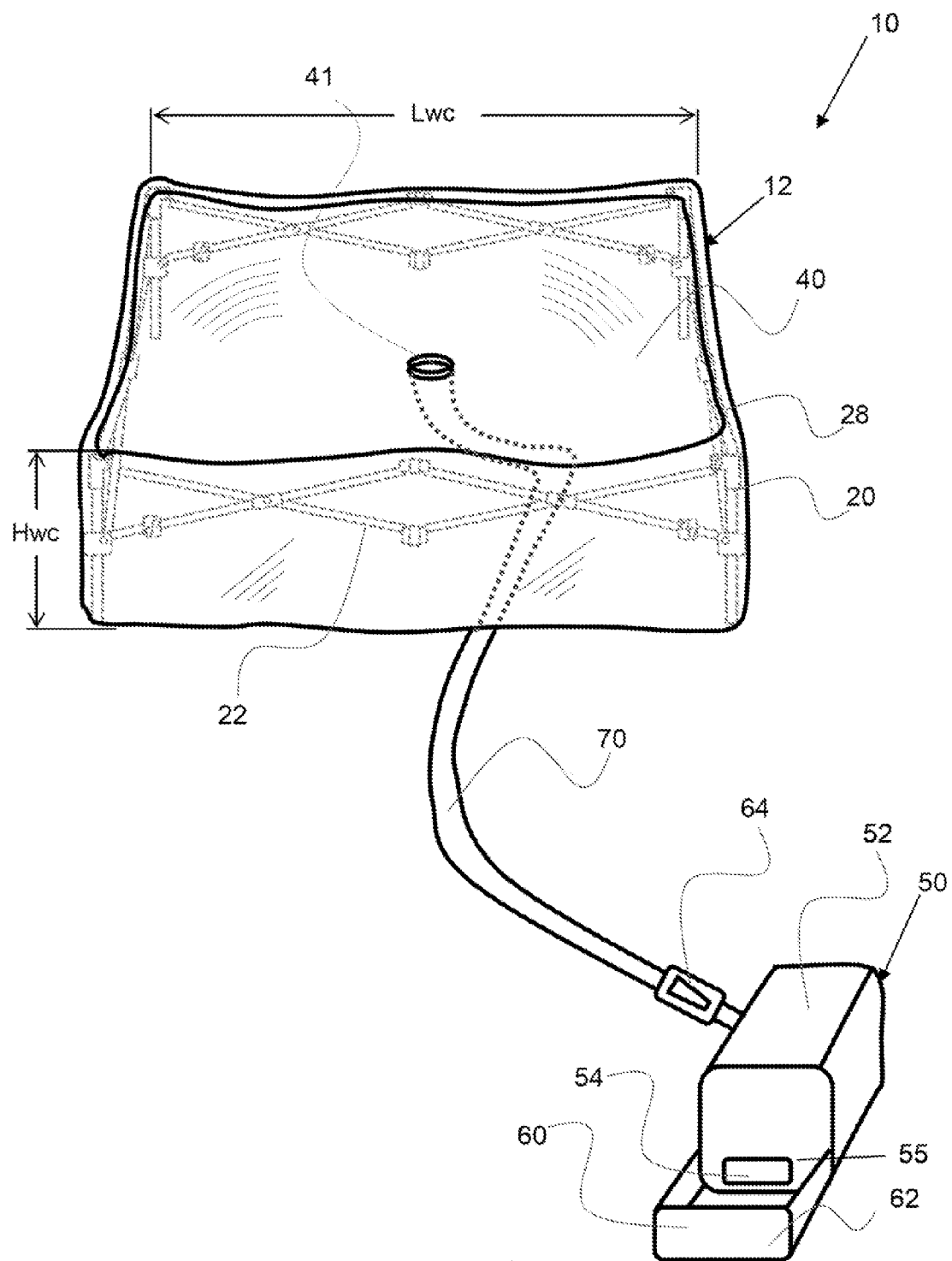

FIG. 1 shows an isometric view of an exemplary portable drinker system comprising a water collector coupled to a conduit for transferring water to a drinker.

Figure 2:
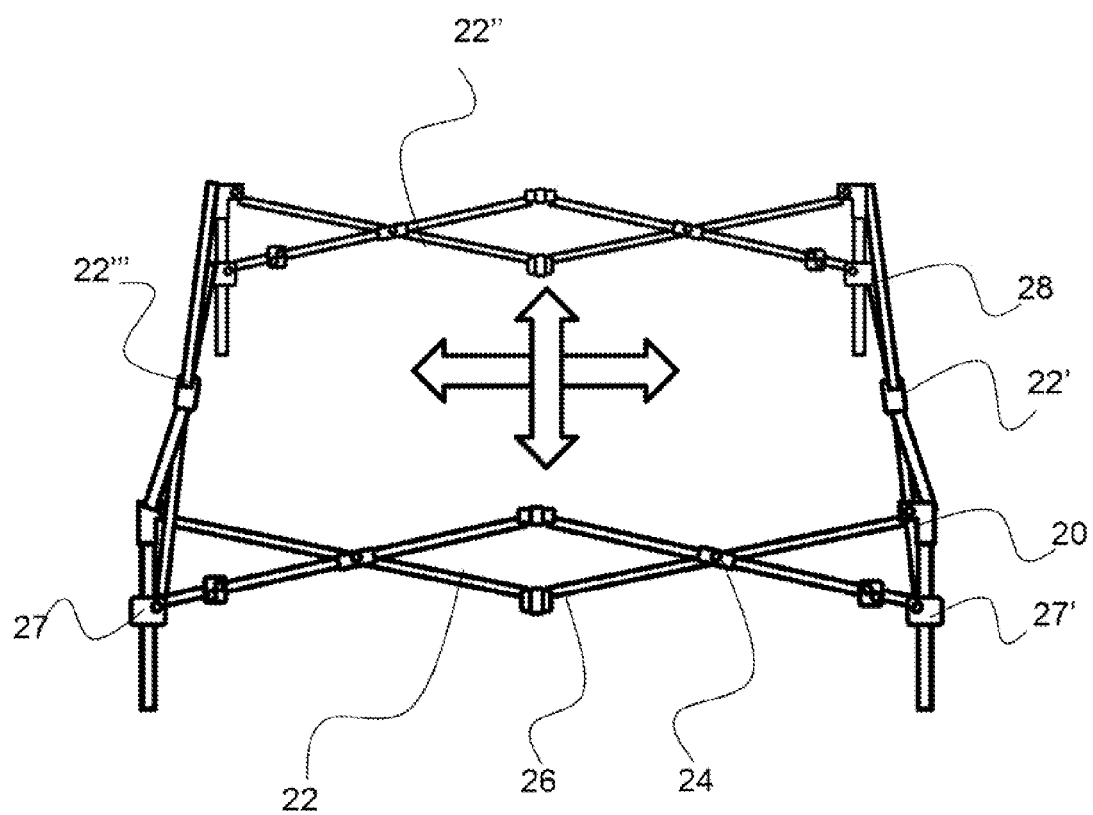

FIG. 2 shows an isometric view of an exemplary convertible frame comprising a plurality of articulating scissor portions.

Figure 3:
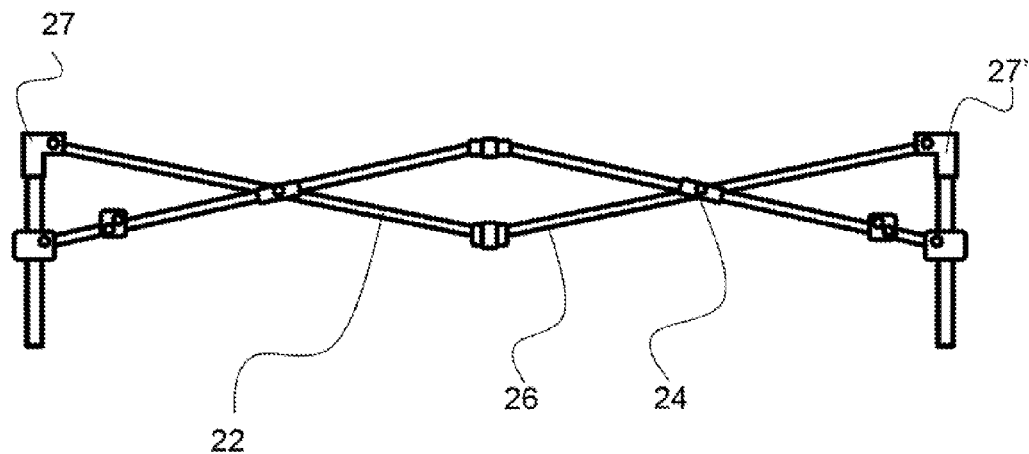

FIG. 3 shows a side view of an exemplary articulating scissor portion in an extended state.

Figure 4:
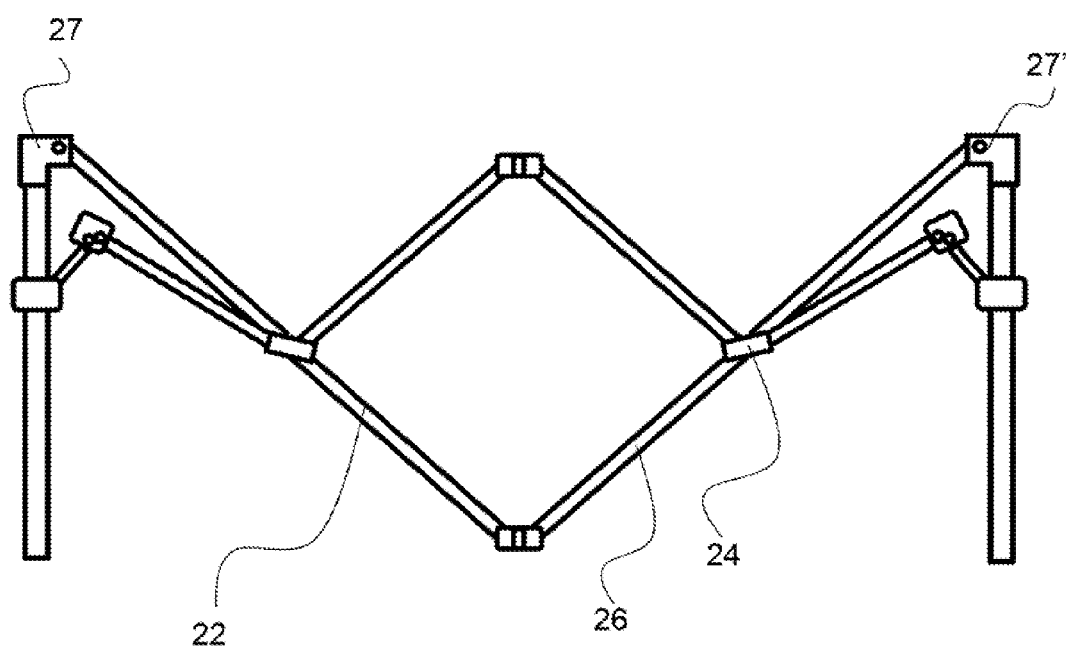

FIG. 4 shows a side view an exemplary articulating scissor portion in a partially extended state.

Figure 5:
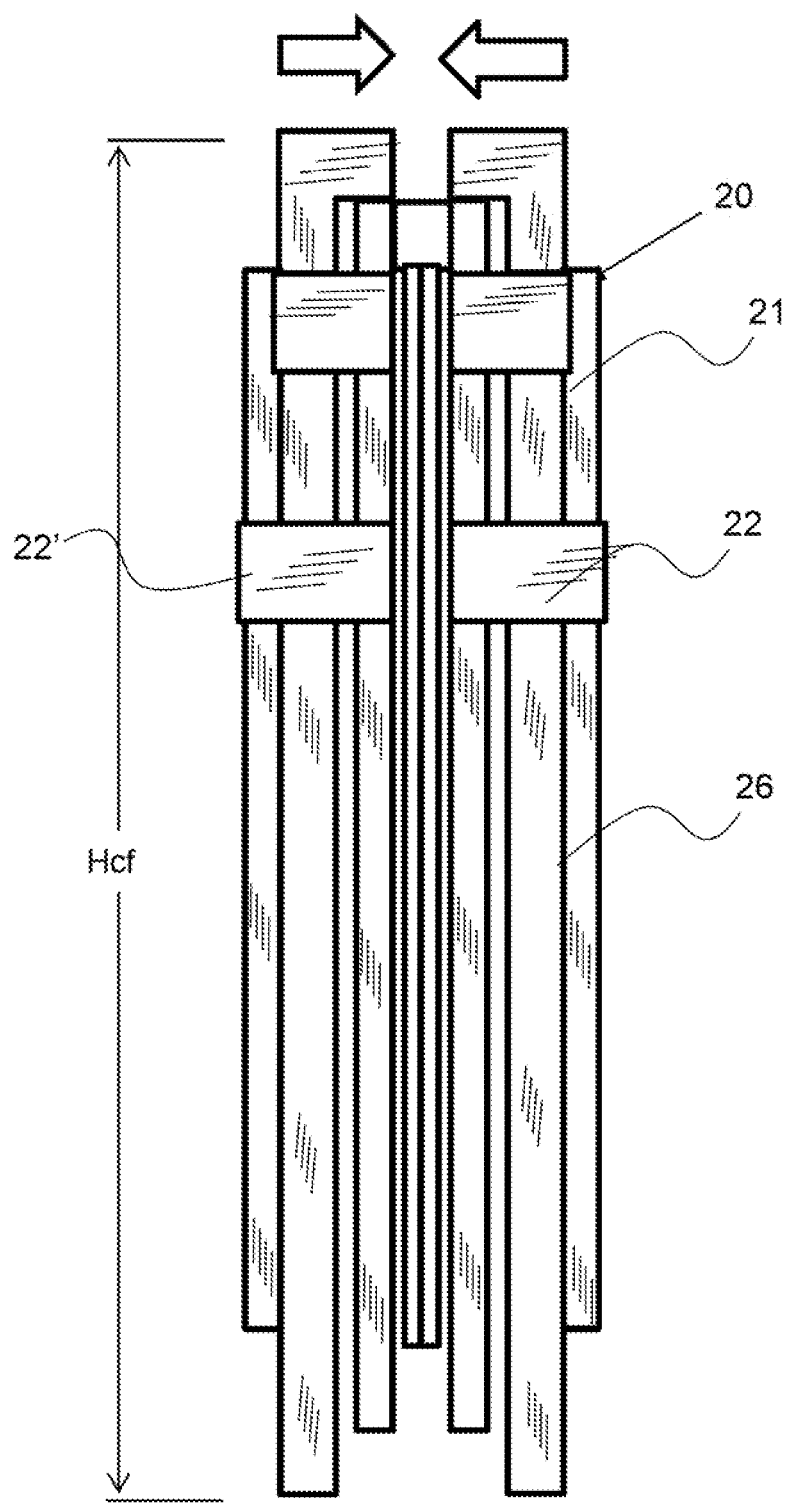

FIG. 5 shows a side view of an exemplary convertible frame comprising a plurality of articulating scissor portions folded into a compact form.

Figure 6:
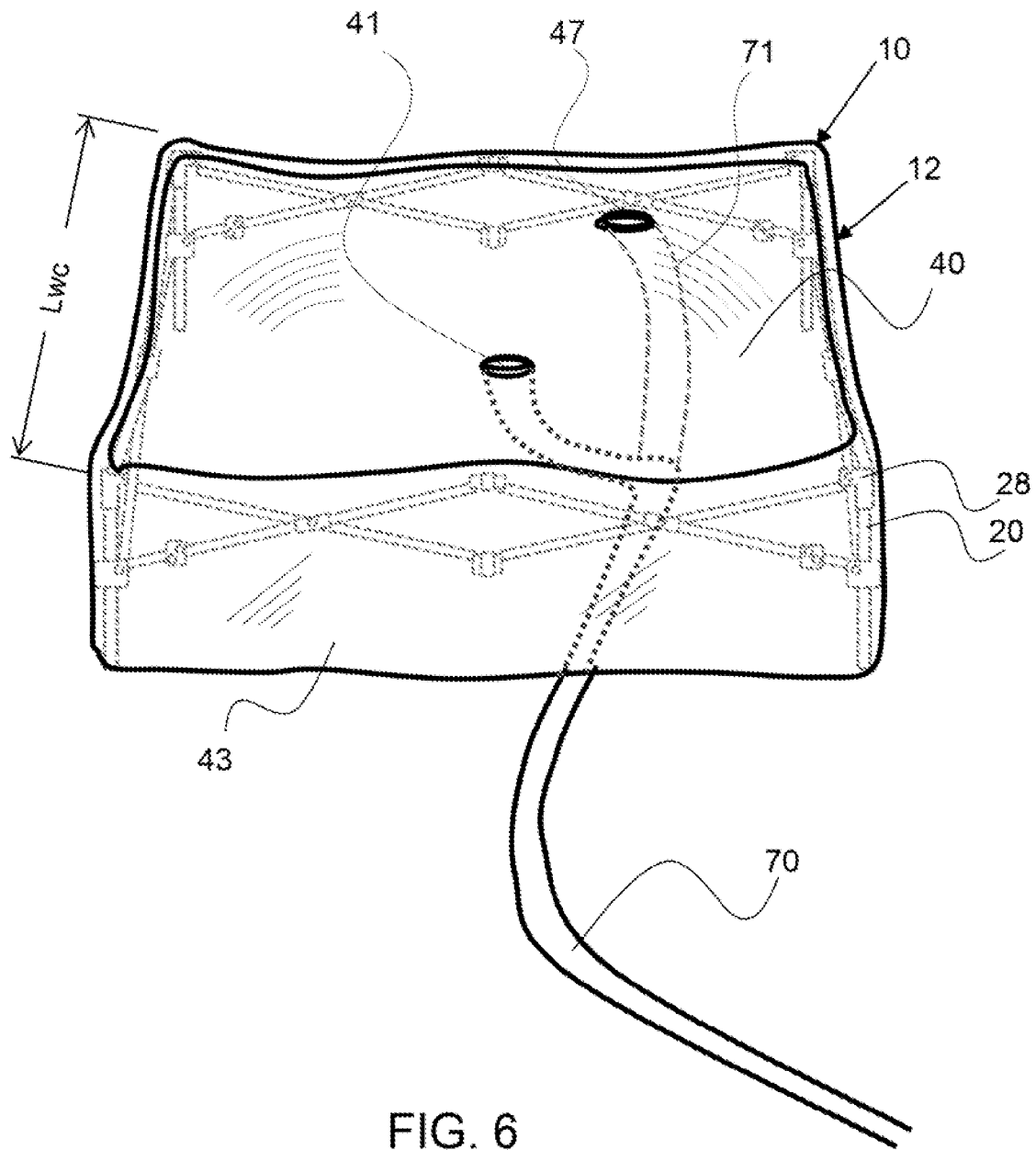

FIG. 6 shows an isometric view of an exemplary portable drinker system comprising a water collector having an overflow conduit coupled to a conduit for transferring water to a drinker.

Figure 7:
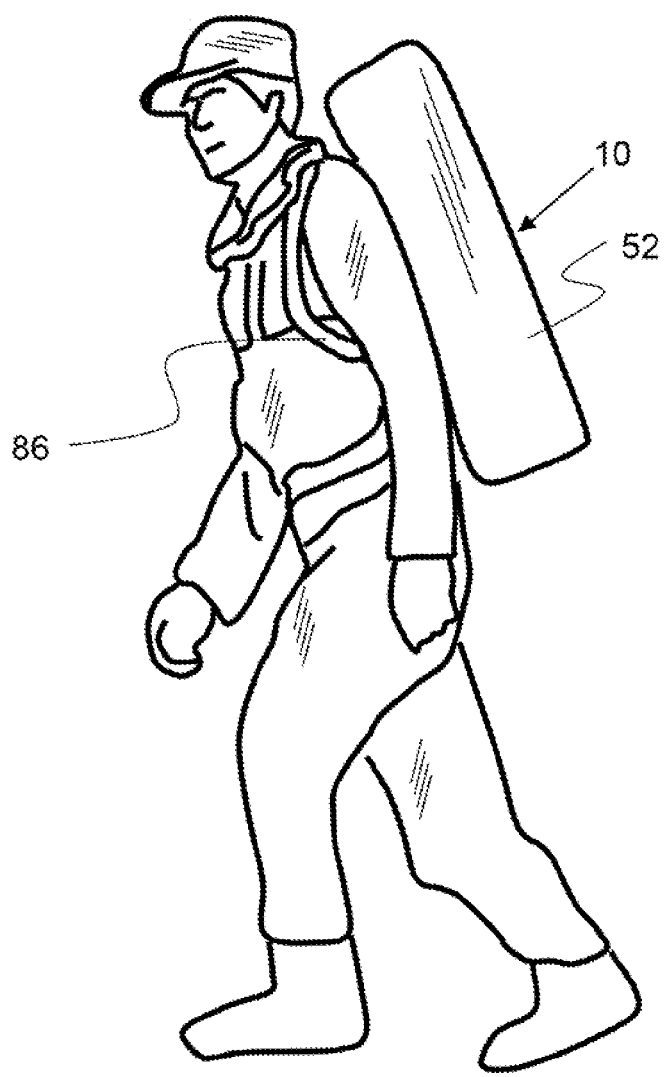

FIG. 7 shows an isometric view of a person with an exemplary portable drinker system configured within a drinker reservoir and configured as a backpack.)

Figure 8:
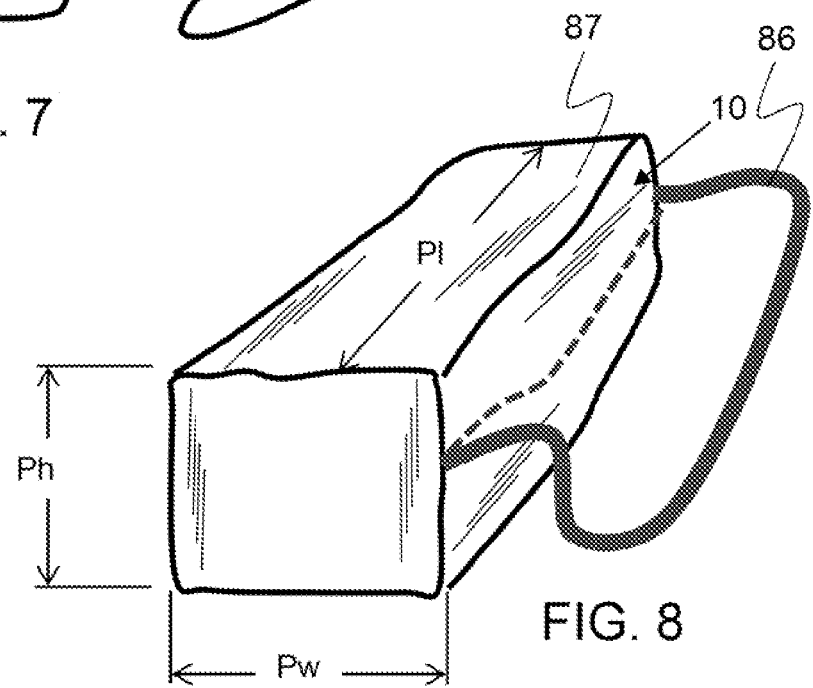

FIG. 8 shows an isometric view of an exemplary portable drinker system configured in an enclosure for manual transport.

Figure 9:
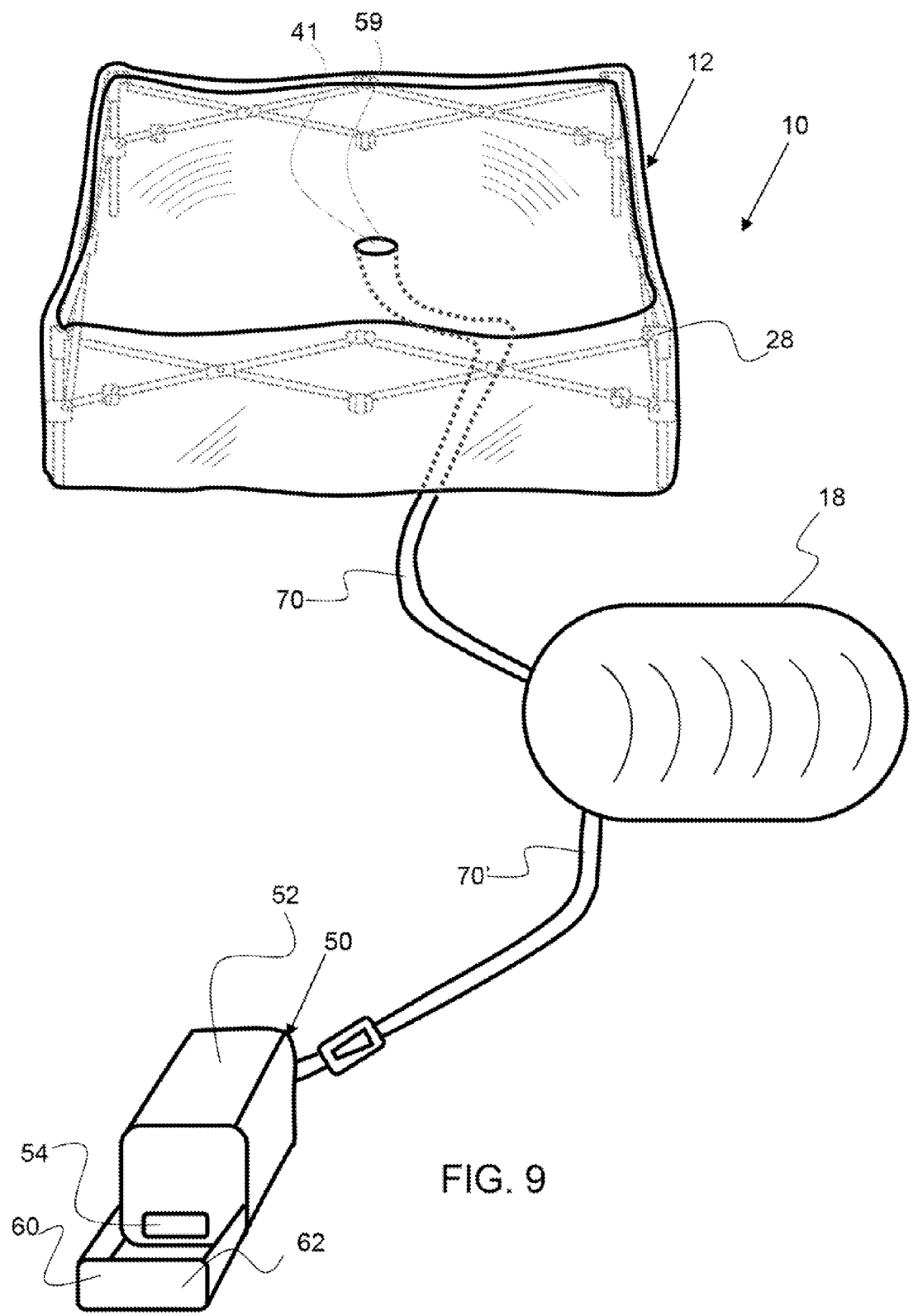

FIG. 9 shows an isometric view of an exemplary portable drinker system comprising a collection reservoir configured between the water collector and a drinker.

Figure 10:
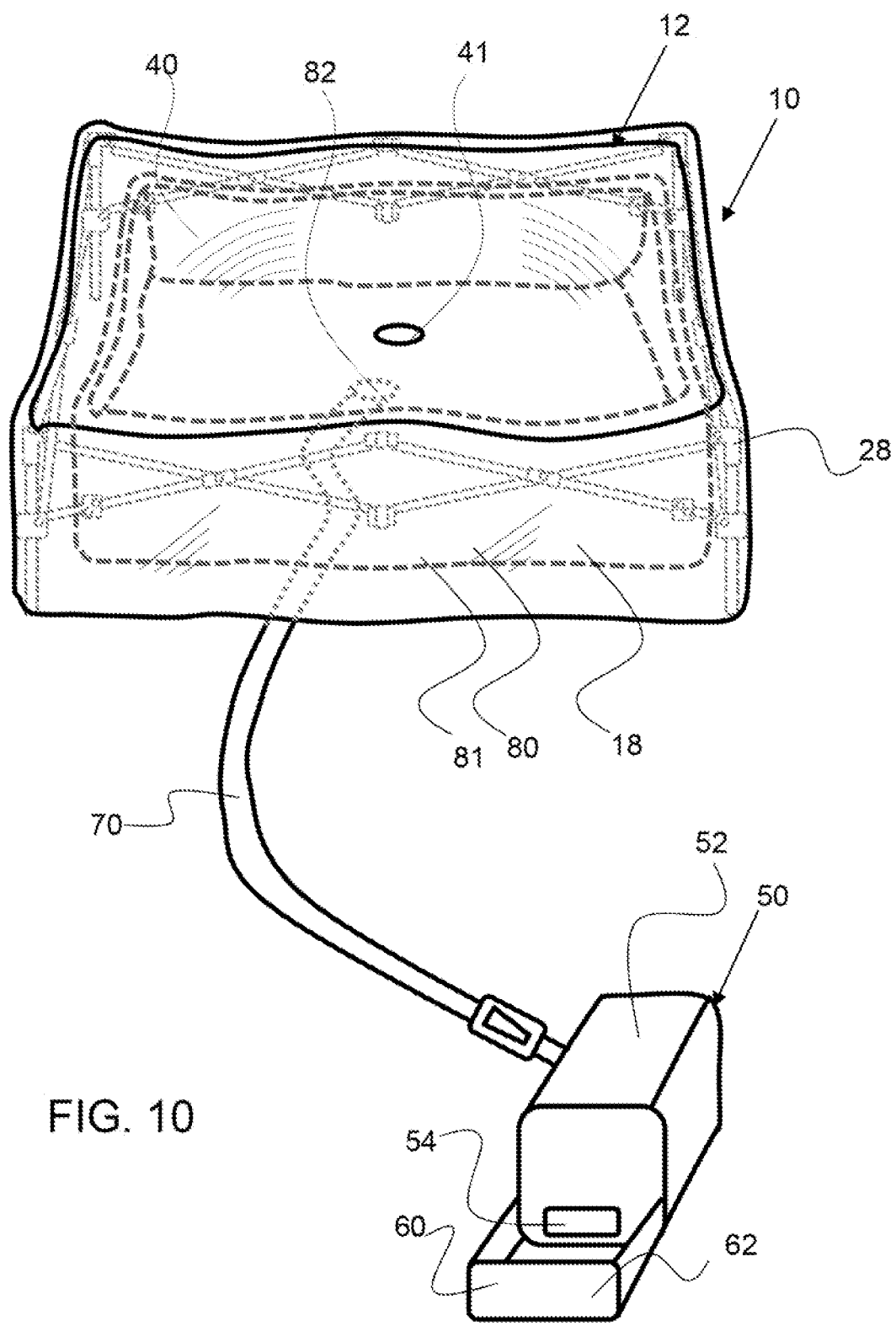

FIG. 10 shows an isometric view of an exemplary portable drinker system comprising an integral reservoir configured under the canopy and within the perimeter of the structural support.

Figure 11:
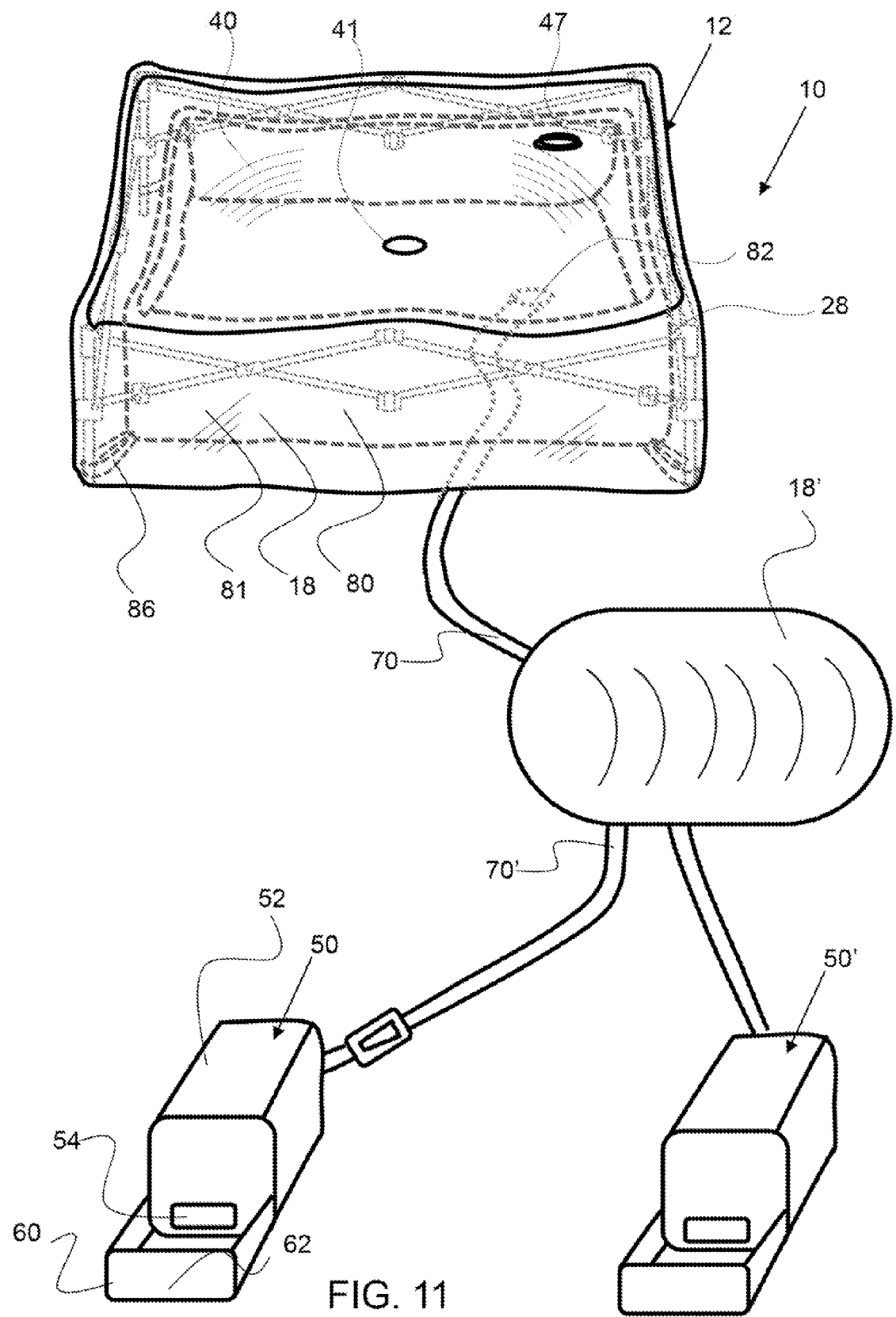
Figure 12:
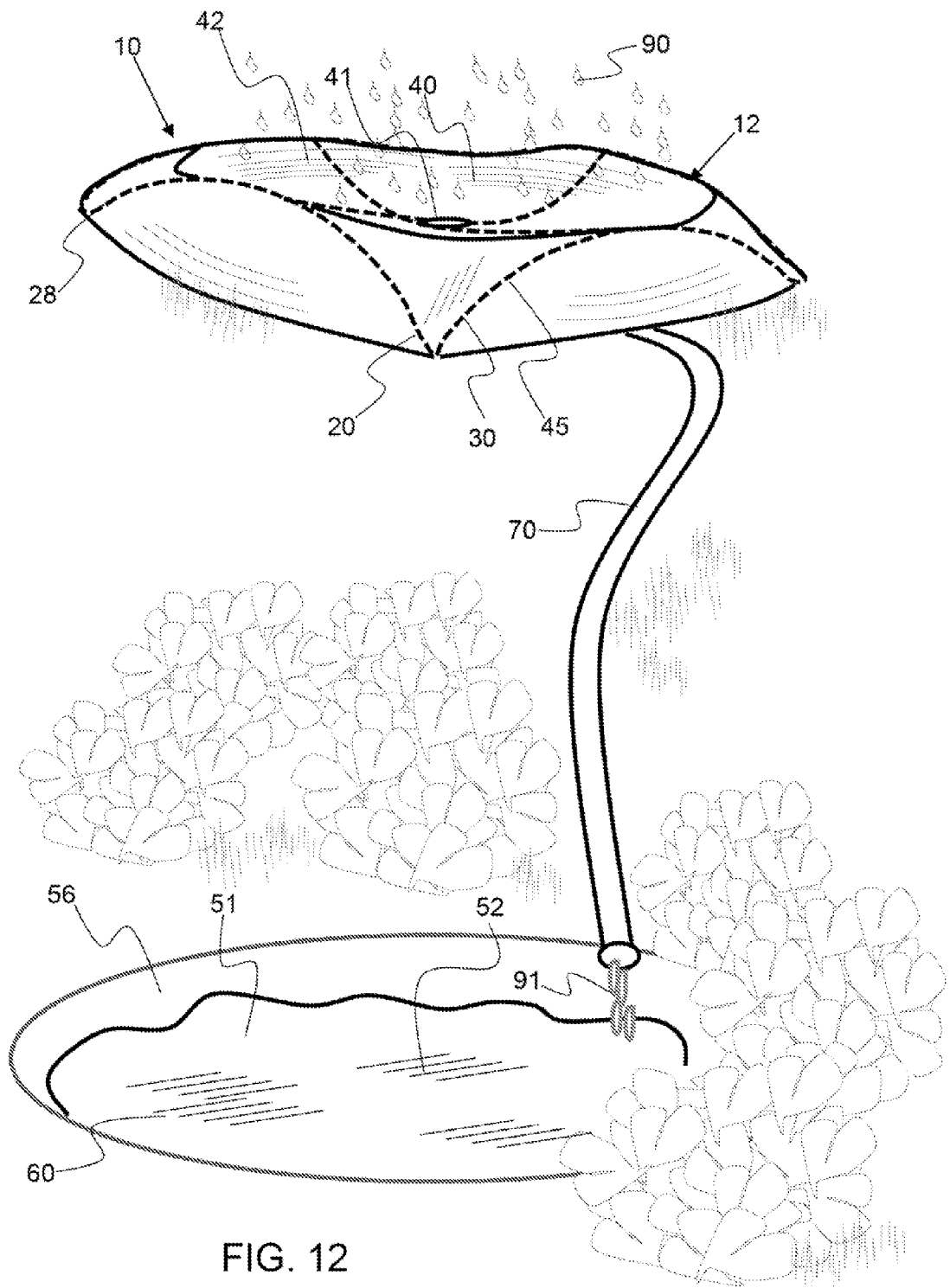

FIG. 11 shows an isometric view of an exemplary portable drinker system comprising an integral reservoir configured under the canopy and within the perimeter of the structural support and a second collection reservoir configured between the water collector and a drinker FIG. 12 shows an isometric view of an exemplary portable drinker system comprising a water collector comprising a structural support of integrally segmented poles.

Figure 13:
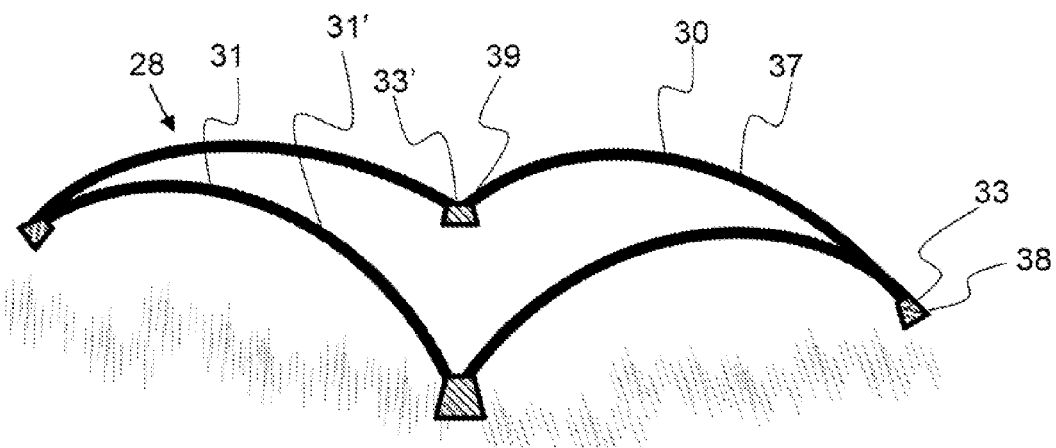

FIG. 13 shows an isometric view of an exemplary support structure comprising integrally segmented poles.

Figure 14:
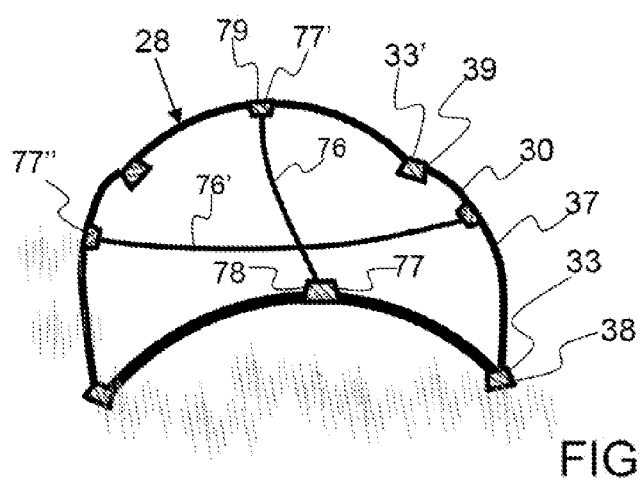

FIG. 14 shows an isometric view of an exemplary support structure comprising integrally segmented poles.

Figure 15:
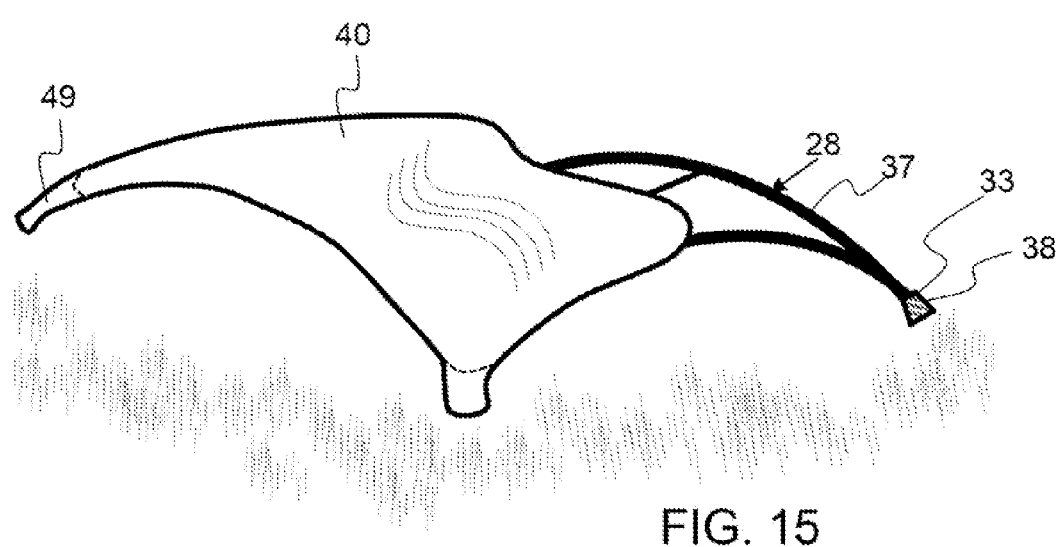

FIG. 15 shows an isometric view of an exemplary support structure comprising integrally segmented poles with a canopy partially coupled thereto.

Figure 16:
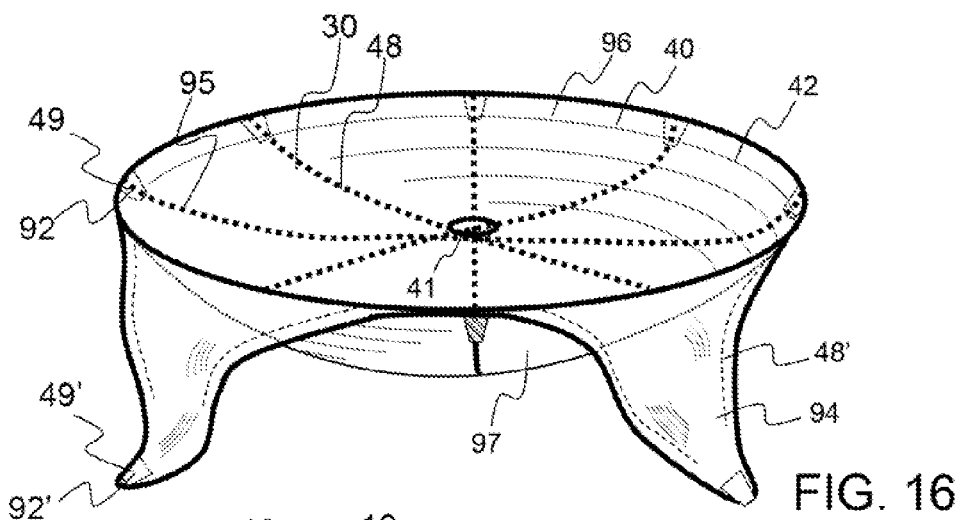

FIG. 16 shows an isometric view of an exemplary canopy having form poles configured across the water collection portion and forming a concave shape.

Figure 17:
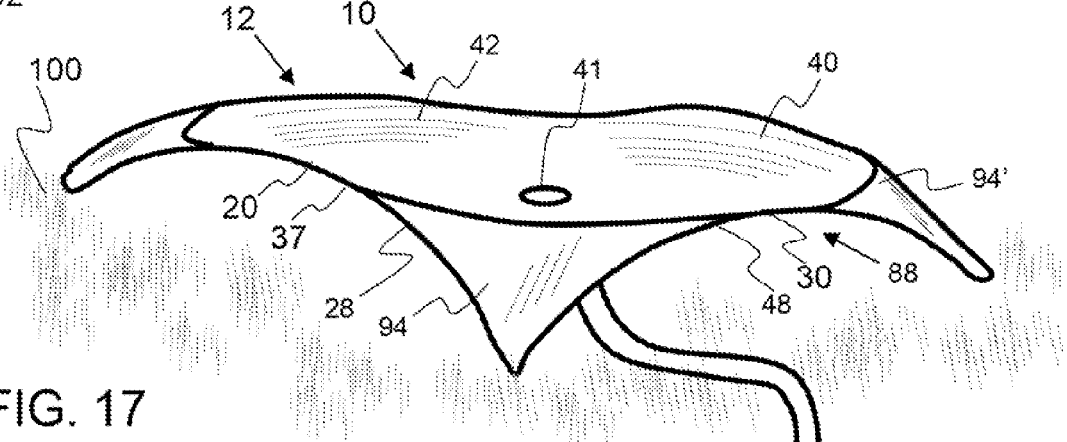

FIG. 17 shows an isometric view of an exemplary water collector comprising a structural support made of integrally segmented poles.

Figure 18:
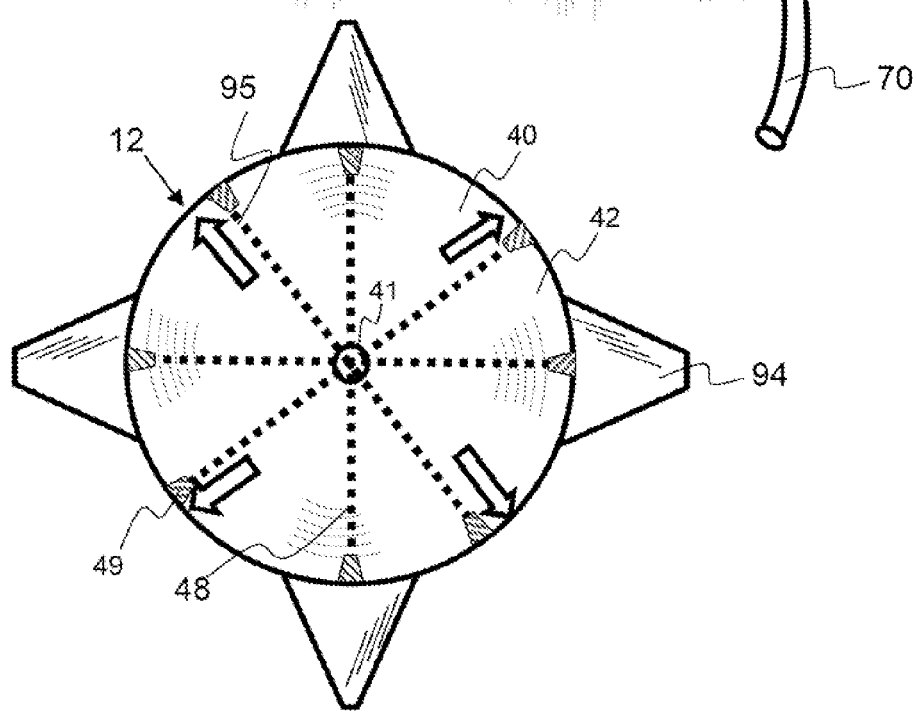

FIG. 18 shows a top-down view of an exemplary water collector comprising a water collection portion and retainer portions.

Figure 19:
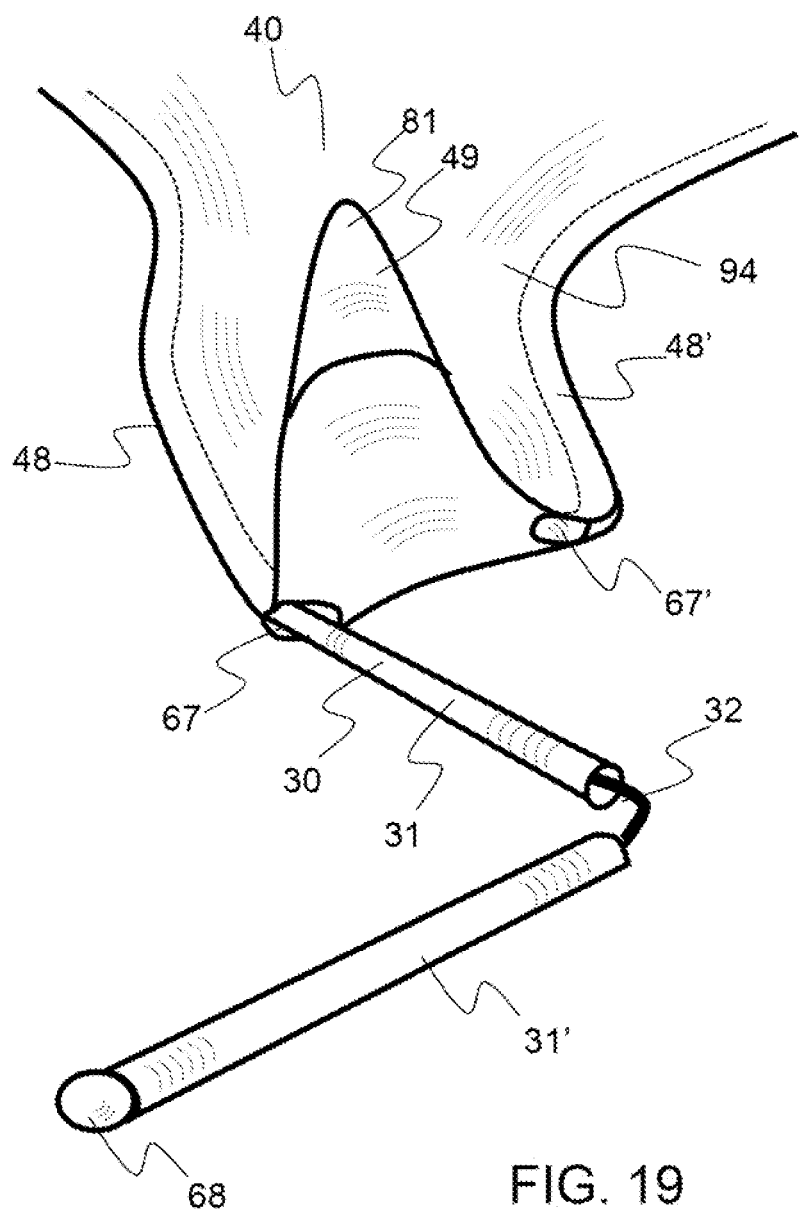

FIG. 19 shows an isometric view of an exemplary canopy having an integrally segment pole inserted partially into a canopy sleeve.

Figure 20:
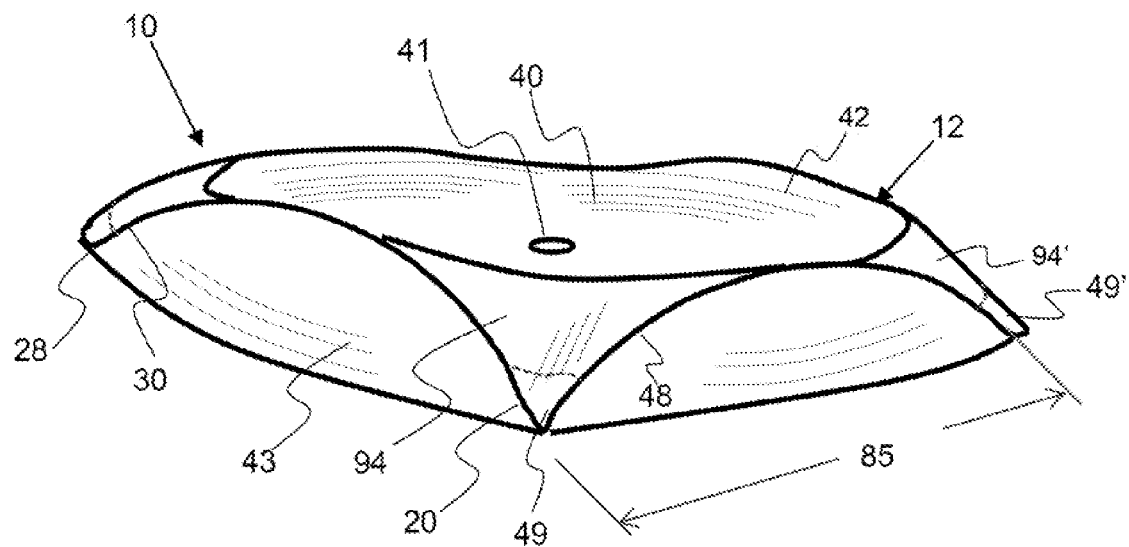

FIG. 20 shows an isometric view of an exemplary water collector having a canopy skirt that extends around the perimeter of the water collector between the ground and the perimeter of the water collection portion.

Figure 21:
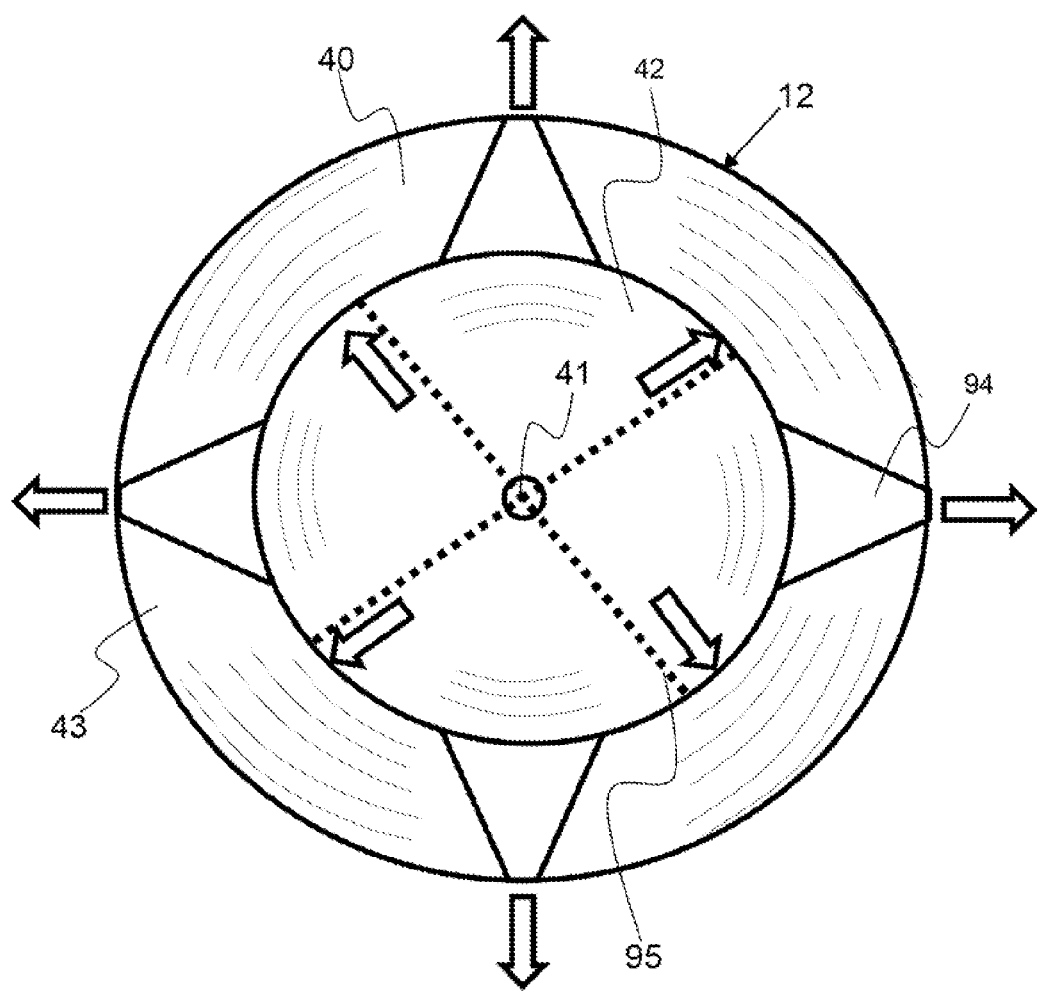

FIG. 21 shows a top-down view of an exemplary water collector comprising a canopy skirt.

Figure 22:
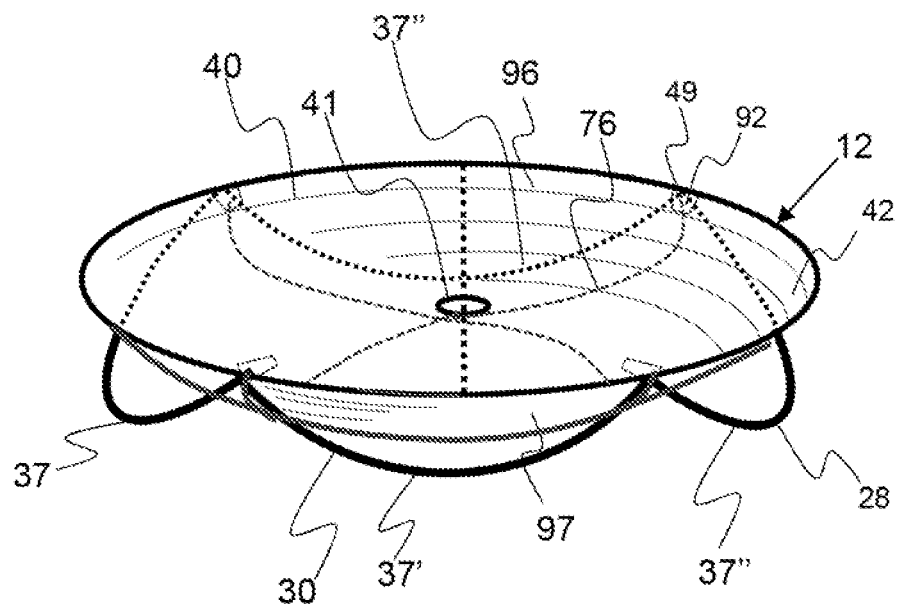

FIG. 22 shows an isometric view of an exemplary water collector having an integrally segmented pole structural support with the first and second ends of the perimeter poles being retained in pole retainers around the perimeter of the water collection portion.

Figure 23:
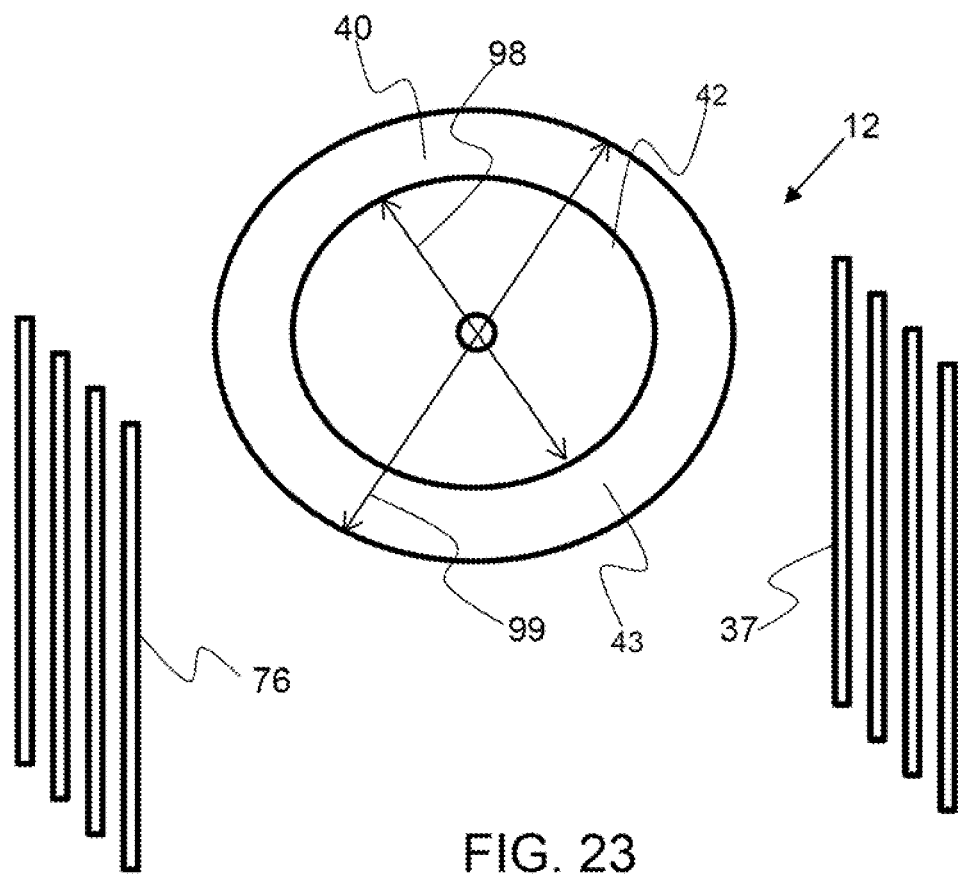

FIG. 23 shows a top-down view of an exemplary water collector comprising a canopy form poles and perimeter poles.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

As shown in FIG. 1, an exemplary portable drinker system 10 comprises a water collector 12 coupled to a conduit 70 for transferring water to a drinker 50. The water collector comprises a canopy 40 coupled to a support structure 28. The support structure is a convertible frame 20 comprising four articulating scissor portions 22 coupled at their ends to form a perimeter for the canopy. The four articulating scissor portions may be attached at their ends or may be separate portions that can be expanded and then coupled to another articulating scissor portion. The height of the support structure, or height of the highest portion of the water collector, Hwc is also shown in FIG. 1. This height may be any suitable height, but it is preferred to keep the water collector close to the ground to make it more stable and to prevent wind from getting under the canopy as it may upset the water collector or cause damage. For example, the height of the water collector may be no more than about 36, no more than about 30 inches, no more than about 24 inches, no more than about 20 inches, no more than about 12 inches and any range between and including the height values provided.

The conduit 70 shown in FIG. 1 is coupled to the drain opening 41 in the canopy and extends to a drinker. The length of the conduit may be any suitable length and in some case may be more than 100 ft. A conduit may comprise a one way valve 64 and in most cases the drinker will be located in a position that is downhill, or below the water collector to ensure proper draining of water from the water collector to the drinker, or collection reservoir. The drinker 50 comprises a drinker reservoir 52, or a reservoir with direct flow of water to a drink portion 60. The drinker reservoir shown in FIG. 1 is a vessel having a rigid shape but may be a collapsible container or open reservoir. A reservoir opening 54 may be configured to automatically fill the drink portion 60 with water when the water level in the drink portion drops below the top 55 of the reservoir opening. The retaining walls 62 of the drink portion may be configured to extend up higher than the top of the reservoir opening. When the water level in the drink portion drops below the top of the reservoir opening, air will enter the drinker reservoir and thereby allow water to flow into the drink portion. This type of arrangement will only expose a limited amount of water to the environment at one time and will conserve the water longer due to reduced evaporation. In an exemplary embodiment, all of the water collected by the water reservoir, except for that provided in a drink portion, is contained within an enclosure, including the conduit, a collection reservoir, or drinker reservoir, whereby evaporation is prevented. The length of one side of the water collector Lwc is shown in FIG. 1. The length may be any suitable dimension, including, but not limited to, about 2 feet of more, about 3 feet or more, about 5 feet or more, about 10 feet or more, and any range between and including the values provided. The collection portion of a canopy may extend any suitable area including, but not limited to, about 5 square feet or more, about 10 square feet or more, about 25 square feet or more, about 50 square feet or more, about 100 square feet or more and any area between and including the area values provided.

As shown in FIG. 2, an exemplary convertible frame 20 comprises a plurality of articulating scissor portions 22-22''' that are connected to form a square support perimeter. Any suitable perimeter shape may be made and any suitable number of articulating scissor portions may be used. For example, three articulating scissor portions may be configured into a triangular perimeter. An articulating scissor portion comprises a plurality of elongated members 26 and pins 24 that enable the elongated members to pivot and thereby allow the articulating scissor portion to fold. A first end 27 may be extended out or folded into a second end 27'.

As shown in FIG. 3, an exemplary articulating scissor portion 22 is in an extended state with the first end 27 being extended away from a second end 27'. As shown in FIG. 4, an exemplary articulating scissor portion 22 is in a partially extended state.

As shown in FIG. 5, an exemplary convertible frame 20, comprising a plurality of articulating scissor portions 22, is folded into a compact form. The height of the convertible frame Hcf is shown and may be any suitable length including, but not limited to, no more than about 36, no more than about 30 inches, no more than about 24 inches, no more than about 20 inches, no more than about 12 inches and any range between and including the height values provided. A plurality of articulating scissor portions may be coupled or attached on their ends form an integral articulating scissor frame 21 requiring simply pulling open to erect the structural support.

As shown in FIG. 6, an exemplary portable drinker system 10 comprises a water collector 12 having an overflow conduit 71 coupled to an overflow drain 47. The overflow conduit is coupled with the primary conduit 70 for transferring water to a drinker but may be coupled to a collection reservoir, or be directly coupled to a drinker by a separate conduit.)

As shown in FIG. 7, a person is carrying an exemplary portable drinker system 10 configured within a drinker reservoir 52 and configured as a backpack. Straps 86 coupled to the compact portable drinker system allow the system to be carried on the person's back. A drinker reservoir may have a removable panel that allows insertion of components of the portable drinker system including a convertible frame, a canopy, a conduit, and a drinker portion, for example. In an exemplary embodiment, all of the components required for the portable drinker system can be configured within a drinker reservoir. This compact configuration enables a hunter to carry the portable drinker system into remote locations, where game animals will find and frequent the drinker system.

As shown in FIG. 8, an exemplary portable drinker system 10 is configured in an enclosure 87 for manual transport. A strap 86 may be coupled to the enclosure. The enclosure may be a lightweight bag having an opening for insertion of the portable drinker system. The opening may comprise a zipper or other closure means.

As shown in FIG. 9, an exemplary portable drinker system 10 comprises a collection reservoir 18 configured between the water collector 12 and a drinker 50. Any number of collection reservoirs may be coupled to a water collector, thereby increasing the holding capacity of the portable drinker system and providing water over a longer period of time. A collection reservoir may be a rigid container, and more preferably a collapsible and expandable container, such as a bag that can increase in volume as water is collected therein. A collapsible and expandable container is more easily carried and stored in an enclosure for transport. A conduit 70 may be detachable attached to a drain opening 41 or overflow drain (not shown) on a canopy. A conduit coupling 59 may allow for quick attachment of a conduit to a drain opening 41. Any suitable type of conduit coupling may be provided, including a snap-on conduit, a threaded conduit coupling like those used with home use hoses, and the like.

As shown in FIG. 10, an exemplary portable drinker system 10 comprises an integral reservoir 80 configured under the canopy 40 and within the perimeter of the structural support 28. An integral reservoir is attached to and part of a canopy. An integral reservoir may be a pocket 81 or pouch that is formed from a separate piece of material that is attached to the underside, bottom, of the canopy 40. A canopy drain opening 41 may open to the integral reservoir and a reservoir) drain 82 may be coupled with a conduit 70 that extends to a drinker 50, or collection reservoir. Any suitable combination and number of drinker system components may be configured and coupled together as desired.

As shown in FIG. 11, an exemplary portable drinker system 10 comprises an integral reservoir 80 configured under the canopy 40 and within the perimeter of the structural support 28. A collection reservoir 18 is configured between the water collector 12 and a drinker 50. The integral reservoir is attached to the convertible frame 20 by straps 86. A reservoir configured under the canopy and within the perimeter of the structural support will provide ballast and prevent the water collector from being upset by wind. An overflow drain 47 is shown opening directly into the integral reservoir. This type of configuration will ensure that water is collected even if the primary drain opening 41 is clogged.

As shown in FIG. 12, an exemplary portable drinker system 10 comprises a water collector 12 comprising a structural support 28 of integrally segmented poles 30. Rain 90 is collecting in the water collection portion 42 of the canopy 40, flowing through the conduit 70 and being dispensed into an open drinker 51. An open drinker may be a natural depression in the ground or may be a dug depression that is lined with a liner 56 material to prevent the water from draining into the ground. Collected water 91 may fill a very large open drinker reservoir 52. The convertible frame 20 comprises integrally segmented poles 30 that are coupled to the canopy 40. The canopy is made of a plurality of sheets of material attached at seams 45. The water collection portion 42 of the canopy is the portion of the canopy that directs water to the drain opening.

As shown in FIG. 13, an exemplary support structure 28 comprises integrally segmented poles 30 that are arranged and retained in pole couplers 33. A pole coupler retains two pole ends in a proximate location to each other. A pole coupler may be a pin attached to a first end of first pole that is inserted into a first end of second pole. A pole coupler may be strap, clamp or a rigid shaped piece of material that allows the poles to be snapped or inserted therein. As shown in FIG. 3, a first pole end 38 extends from a first pole coupler 33 to a second pole coupler 33' for the second pole end 39. Four perimeter poles 37 are shown being configured to create a structural support perimeter. The segmented poles shown are extended poles comprising two or more pole segments 31, 31'.

As shown in FIG. 14, an exemplary support structure comprises integrally segmented poles 30 including perimeter poles 37 and form poles 76. The form poles 76 extend across and couple two separate perimeter poles and help to maintain the perimeter shape. A form pole may be coupled to a perimeter pole by a form fastener 77. As shown in FIG. 14, form pole 76 is configured with a first end 78 attached to a first perimeter pole and a second end 79 attached to a second perimeter pole. This arrangement keeps the first and second perimeter poles in a desired location and provides additional support to the support structure.

As shown in FIG. 15, an exemplary support structure 28 comprises integrally segmented poles 30 with a canopy 40 partially coupled thereto. The canopy 40 has a pole retainer 49 for coupling one or more poles to the canopy and, as shown, is a pocket wherein a first and second perimeter pole can be inserted therein.

As shown in FIG. 16, an exemplary canopy 40 has shape poles 95 configured across the water collection portion 42 and forming a concave shape. Three shape poles 95 may be coupled to a perimeter pole on either end, thereby making the shape pole also act as a form pole. The attachment to both the canopy and two perimeter poles will further strengthen the water collector. The canopy comprises sleeves 48 wherein the shape poles can be inserted therethrough and retained. A canopy sleeve may extend any suitable length across the canopy and may be configured to open and incorporate a snap and loop fasteners, for example. The length of the shape poles 95 is greater than the length between retention points on the canopy, thereby causing the shape poles to form a domed shape. A pocket 92, or other pole retainer 49 may be configured on the canopy for retention of a shape pole end. In an exemplary embodiment, pockets 92 are sewn onto the canopy in the desired location of the insertion of shape pole ends. In addition, the canopy 40 comprises pockets 92' for the retention of perimeter poles (not shown). A canopy sleeve 48' is configured for retaining the perimeter poles along a retainer portion 94 of a canopy 40. The shape poles 95 may extend along the bottom side 97 of the canopy, thereby leaving the top side 96 or surface smooth to prevent the collection of debris.

As shown in FIG. 17, an exemplary portable drinker system 10 comprises a water collector 12 having a structural support 28 made of integrally segmented poles 30 that are coupled to the canopy 40. A conduit 70 is shown being) coupled to the drain opening 41 and extending out from under the canopy. The perimeter poles 37 are coupled to the outer perimeter of the canopy and retain and give shape to the canopy. The integrally segmented poles are retained by canopy sleeves 48 along the outer edge of the canopy. In this embodiment, the canopy has open area 88 around the perimeter between the retainer portions 94, 94', for example. This open area reduces the weight of the canopy but may allow wind to enter between the canopy and the ground surface 100. The collection portion 42 of the canopy has a concave shape, whereby precipitation such as rain will flow down to the drain opening.

As shown in FIG. 18, an exemplary water collector 12 comprises a water collection portion 42 and retainer portions 94. Any number of retainer portions may be configured on a water collector, such as two, three, four, as shown, five, six or more than six. Three shape poles are show in dashed lines extending across the water collection portion 42. The shape poles may be attached to the canopy by a pole retainer 49, such as a pocket sewn into the canopy in desired locations. The shape poles are configured through canopy sleeves 48.

As shown in FIG. 19, an exemplary canopy 40 has an integrally segment pole 30 being inserted partially into a canopy sleeve 48. The pole segment 31 is partial inserted into the sleeve opening 67 and a coupling cord 32 couples the first pole segment 31 with a second pole segment 31'. Adjoining ends of the pole segments may be configured to attach to each other, whereby one end has a smaller diameter than the adjacent end of a second pole segment. This design in commonly used for tent poles. The second pole segment 31' may be coupled to the first pole segment 31 and the two pole segments may be pushed through the canopy sleeve 48. The proximal end of the second pole segment, having a pole end feature 68, may then be placed into the pole retainer 49 or pocket 81 configured at the end of the retainer portion 94 of the canopy. The distal end of the first pole segment may protrude out of a sleeve on a second retainer portion of the canopy and be inserted into the pocket. A first canopy retainer end may be forced toward a second canopy retainer and thereby cause an integrally segmented pole extended there between to bow or arc. This arced form may be fixed to create the structural support for the canopy.

As shown in FIG. 20, an exemplary water collector 12 has a canopy skirt 43 that extends around the perimeter of the water collector. The water collector shown in FIG. 20 has substantially no open area around the perimeter of the water collection surface whereby wind can enter. The skirt may have a length 85 along the ground or perimeter that is less than the length of an integrally segmented pole extending from a first retainer portion 94 to a second retainer portion 94'. This will cause the first and second retainer portions to be forced closer to each other when the integrally segmented pole is retained by a pole retainer 49, 49' in each of the retainer portions 94, 94' respectively.

As shown in FIG. 21, an exemplary water collector 12 comprises a canopy skirt 43 that extends around the perimeter of the canopy between the retainer portions 94. In this embodiment, there are four retainer portions that extend out radially from the water collection portion 42 and there are two shape poles 95, that extend across the water collection portion and terminate substantially equal distance between the retainer portions.

As shown in FIG. 22, an exemplary water collector 12 has integrally segmented poles 30 that form the structural support 28. The first and second ends of the perimeter poles 37 are retained in pole retainers 49 around the perimeter of the water collection portion 42. The ends of the poles stick up, whereas in other embodiments shown, the ends of the perimeter poles terminated in pole retainers that are configured on the ground. Coupling poles 76 extend across and under the collection portion 42 of the canopy 40 and are in some cases coupled to the ends of the perimeter poles. Three pole ends terminate in one pole retainer 49 including two perimeter pole ends and one coupling pole 76 end. All of the poles are configured under the top side 96 of the canopy or top surface. The bottom side 97 of the canopy is supported by the coupling poles.

Any suitable arrangement of integrally segmented poles may be used to support and give the canopy shape. The embodiments shown are some examples and are not meant to limit the scope of the present invention.

As shown in FIG. 23, an exemplary water collector 12 comprises a canopy 40, coupling poles 76 and perimeter poles 37. The items shown may be sufficient to erect a water collector as described herein. The components shown may be configured to be carried in an enclosure so that the water collector can be transported manually to a remote location and erected.

The water collectors described herein may be flexible and bend and give to prevailing wind. The support structure and the water collector itself may be resilient, lightweight and durable.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed:

1. A portable drinker system comprising:
   a) a water collector comprising:
      a flexible canopy comprising a drain opening;
      a convertible frame that is expandable from a packed volume to form an expanded supporting structure for the flexible canopy;
      wherein said canopy extends over and is supported about a perimeter of said convertible frame;
   b) a collapsible water reservoir that is separate from the flexible canopy;
      wherein the flexible canopy is configured to extend down from the perimeter of the convertible frame to the drain opening;
      wherein the portable drinker system is configured to capture rain in the water collector and dispense said captured rain through a conduit to the water reservoir and to a drinker; and
      wherein the portable drinker system is configured to be carried by a single person having no packed dimension of greater than about 48 inches and a weight of less than about 60 lbs.

2. The portable drinker system of claim 1, wherein the convertible triune extends no more than 36 inches off a ground surface when erected.

3. The portable drinker system of claim 1, wherein the convertible frame comprises an articulating scissor portion comprising a plurality of elongated supports coupled together between a first and a second end of the articulating scissor portion by a plurality of pins, and wherein the elongated supports are rotatable about said plurality of pins to expand the articulating scissor portion from the packed volume having a packed length from the first and second end to an expanded length that is greater than said packed length.

4. The portable drinker system of claim 3, wherein the convertible frame is an integral articulating scissor frame comprising a plurality of the articulating scissor portions that are attached to each other at the first and second ends to form an integral articulating scissor frame that is expandable to form the perimeter for the flexible canopy.

5. The portable drinker system of claim wherein the convertible frame consists essentially of articulating scissor portions.

6. The portable drinker system of claim 1, wherein the convertible frame comprise as plurality of integrally segmented poles comprising:
   a plurality of pole segments;
   a coupling cord extending between and coupling the plurality of pole segments together; and
   wherein a first pole segment is configured with a first end that detachably attached to a second end of a second pole segment.

7. The portable drinker system of claim 6, wherein the plurality of integrally segmented poles comprises:
   a. at least two perimeter poles;
   b. at least one coupling pole;
   wherein said at least one coupling pole is configured to extend between two of the at least two perimeter poles.

8. The portable drinker system of claim 6, wherein the canopy is configured with at least one sleeve for receiving at least one of said plurality of integrally segmented poles.

9. The portable drinker system of claim 1, wherein the canopy has a water collection portion that has an area of about 10 square feet or more.

10. The portable drinker system of claim 1, wherein the canopy comprises a conduit coupling for detachably attaching, a conduit.

11. The portable drinker system of claim 1, wherein said drinker comprises
    a drink portion;
    a drinker reservoir;
    whereby water collected by said canopy is directed through said conduit to said drinker.

12. The portable drinker system of claim 11, wherein the drinker reservoir comprises a vessel whereby the entire portable drinker system can be carried in said vessel.

13. The portable drinker system of claim 11, whereby water contained within said drinker reservoir is dispensed to said drink portion through an opening, in said drinker reservoir automatically when a drink portion water level drops below a preset level.

14. The portable drinker system of claim 1, wherein the water collection reservoir is a flexible bag.

15. The portable drinker system of claim 14, wherein the flexible bag is configured under the canopy and coupled to the drain opening.

16. The portable drinker system of claim 1, further comprising at least one carrying strap, whereby said portable drinker system can be carried by a single person in a hands-free manner.

17. A portable drinker system comprising:
   a) a water collector comprising:
      i) a convertible frame that is expandable from a packed volume to form an expanded supporting structure for the flexible canopy;
      wherein the convertible frame comprises an articulating scissor portion comprising a plurality of elongated supports coupled together between a first and a second end of the articulating scissor portion by a plurality of pins, and wherein the elongated supports are rotatable about said plurality of pins to expand the articulating scissor portion from a packed volume, having a packed length from the first and second end, to an expanded length that is greater than said packed length
      iii) a flexible canopy comprising a drain opening;
   b) a drinker comprising:
      i. a drink portion;
      ii. a drinker reservoir;
   c) a collapsible water collection reservoir that is separate from the flexible canopy;
   d) a conduit coupled to said drain opening;
      whereby water collected by said canopy is provided to said drinker;
      wherein said canopy is configured to extend over and be supported by said convertible frame;
      wherein the convertible frame extends no mare than 36 inches off a ground surface when erected;
      wherein said portable drinker system is configured to be carried by a single person having no packed dimension of greater than about 48 inches and a weight of less than about 60 lbs.

* * * * *